(12) United States Patent
Kraft

(10) Patent No.: US 6,381,474 B1
(45) Date of Patent: *Apr. 30, 2002

(54) METHOD OF HANDLING PHONE OPERATIONS AND A PHONE USING THE METHOD

(75) Inventor: Christian Rossing Kraft, Copenhagen (DK)

(73) Assignee: Nokia Mobile Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,140

(22) Filed: Jun. 12, 1998

(30) Foreign Application Priority Data

Jun. 17, 1997 (GB) ............................................ 9712780

(51) Int. Cl.⁷ ................................................ H04Q 7/20
(52) U.S. Cl. ...................... 455/566; 455/550; 455/575
(58) Field of Search ........................... 379/93.17, 93.29, 379/142; 345/902; 455/566, 550, 414, 575

(56) References Cited

U.S. PATENT DOCUMENTS

| | | | | |
|---|---|---|---|---|
| 5,465,401 A | * | 11/1995 | Thompson | ............... 455/90 X |
| 5,479,476 A | | 12/1995 | Finke-Anlauff | ............. 379/58 |
| 5,577,103 A | * | 11/1996 | Foti | ........................... 455/412 |
| 5,758,295 A | * | 5/1998 | Ahlberg et al. | ............. 455/566 |
| 5,774,540 A | * | 6/1998 | Davidson et al. | ........ 379/93.17 |
| 6,055,439 A | * | 4/2000 | Helin et al. | .................. 455/550 |

FOREIGN PATENT DOCUMENTS

| | | |
|---|---|---|
| EP | 0 651 543 A2 | 5/1995 |
| EP | 0 653 875 A2 | 5/1995 |
| EP | 0 751 627 A2 | 1/1997 |
| GB | 2 285 897 A | 7/1995 |
| GB | 2 293 474 A | 3/1996 |
| WO | WO 96/32800 | 10/1996 |

* cited by examiner

Primary Examiner—Nay Maung
(74) Attorney, Agent, or Firm—Perman & Green, LLP

(57) ABSTRACT

A handset allowing the user to establish a connection via a telecommunications network includes Redo and Undo facilities. The handset comprises a transceiver for communication with the network, means for inputting information into the phone and a display for displaying information to the user. A controller unit controls the activity of the transceiver, the input means and the display. The means for inputting information are usable for performing a number of different actions including phone settings and calls handling. The controller unit is provided with memory means for storing a list containing the latest actions, said list being currently updated by the controller unit. The inputting means comprises means for requesting the display of at least a part of said updated action list on said display. The inputting means further comprises means for redoing or undoing a selected action from said displayed action list.

11 Claims, 3 Drawing Sheets

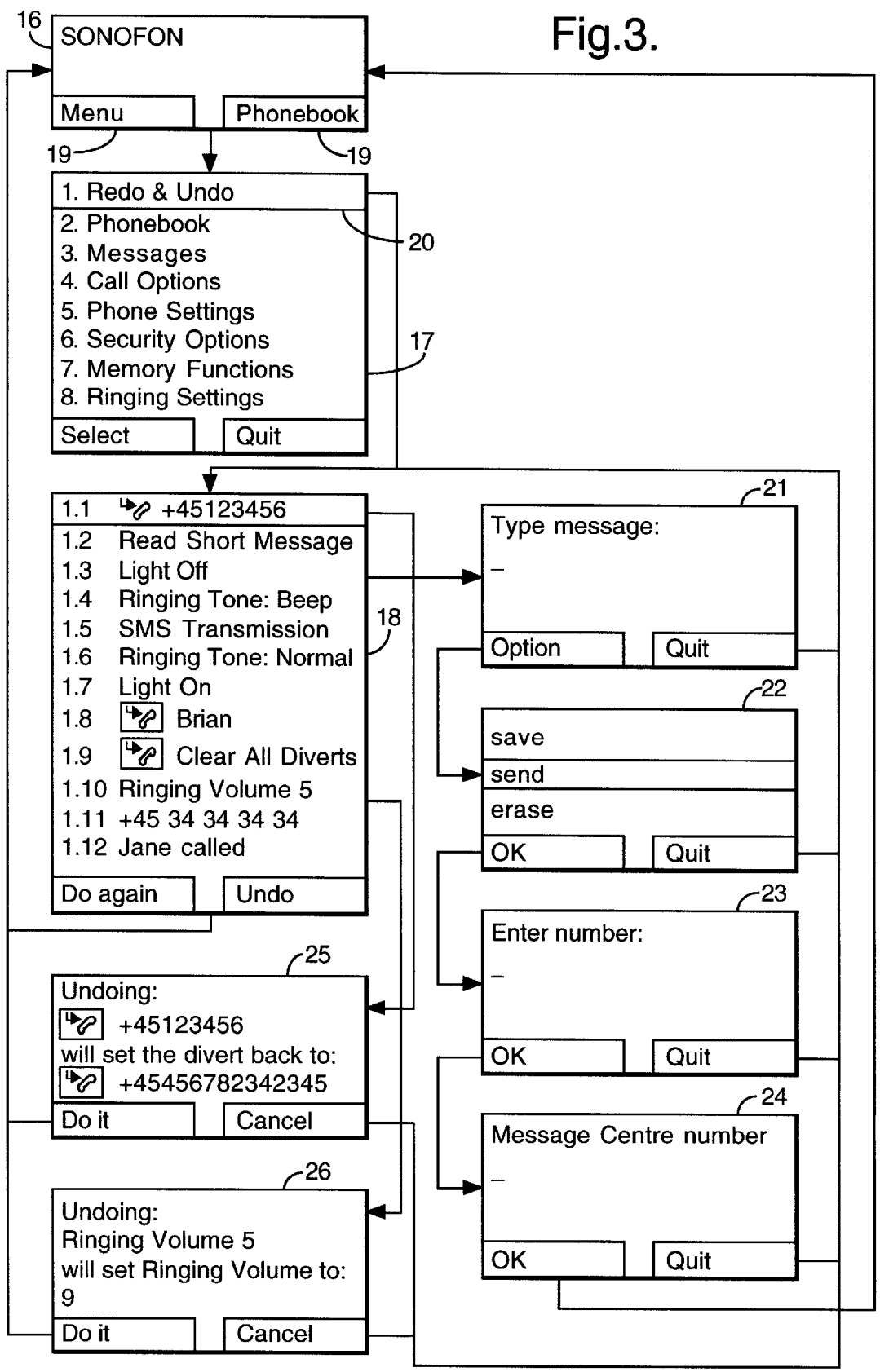

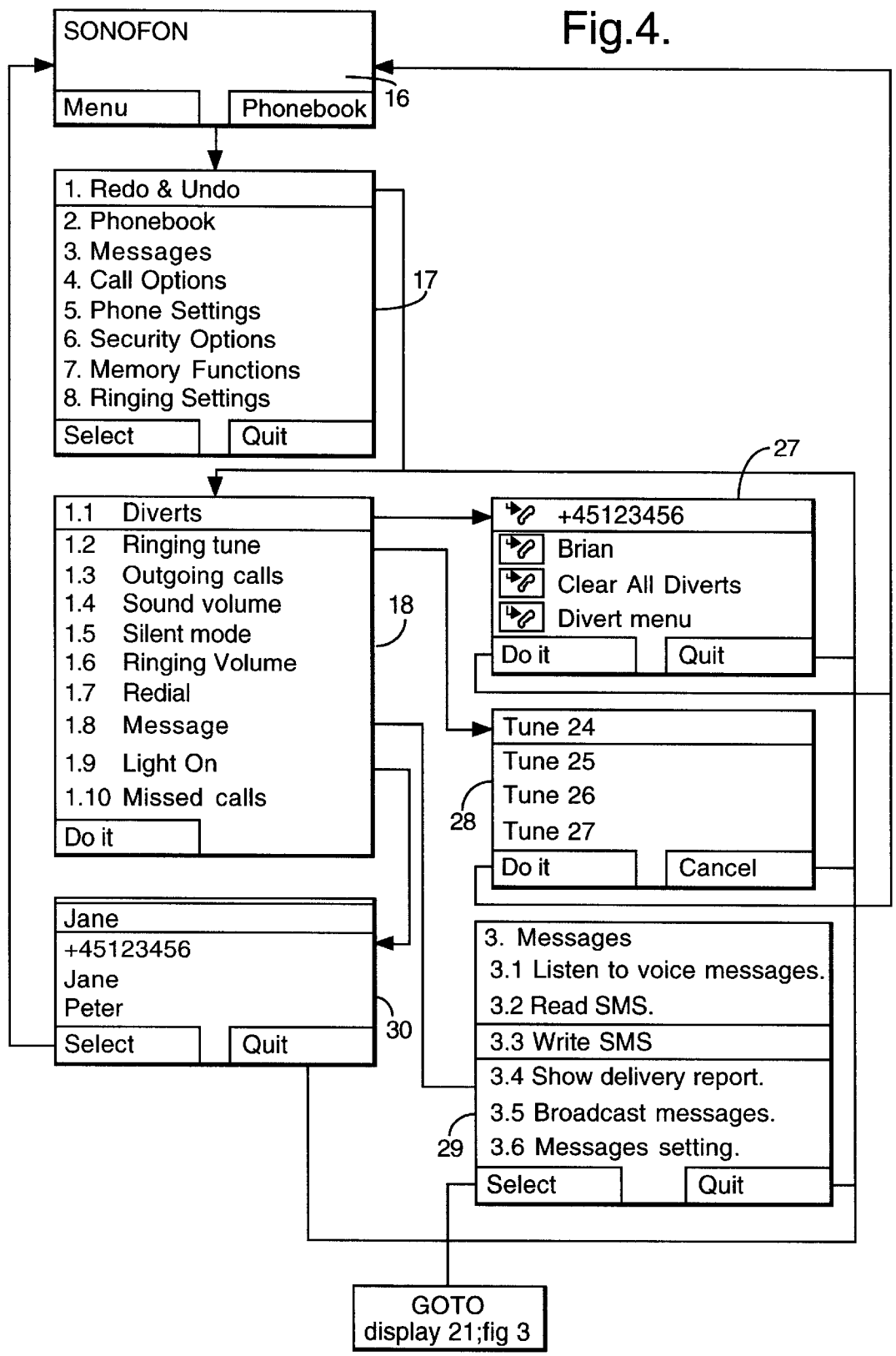

METHOD OF HANDLING PHONE OPERATIONS AND A PHONE USING THE METHOD

BACKGROUND OF THE INVENTION

The invention relates to a method of handling the control of a dynamic user interface of a handset that allows the user easy access to the most commonly used functionalities of the phone. The invention furthermore relates to a phone using such a method and in particular to a cellular phone using such a method.

The text editing program MicrosoftWord™ from Microsoft Corporation© includes a text editing facility "REDO"/"UNDO". By means of this facility the last change made in a document, such as editing, formatting, checking spelling, and inserting breaks, footnotes, and tables may be undone and—when undone—redone again. This is a very nice facility when editing a text.

The usability of this feature has been recognized within technical fields other than pure text editing. EP 653875 describes how the activation of an UNDO key on a facsimile apparatus may reverse the previous user command and cause the apparatus to return to a state it had just before the previous user command. However, the UNDO key mainly has the appearance of a "regret key" to avoid transmission disasters and to allow the user to escape a complicated menu structure. The user interface does not become more dynamic even though it may be said that the user interface has become more user-friendly.

At present a major portion of commercially available portable phones allow the user access to several lists including outgoing calls list, ingoing calls list and missed calls list. However, not all the users find these lists valuable. Most users find it easier to access frequently used numbers via the phone book of the phone than using the outgoing calls list.

SUMMARY OF THE INVENTION

In accordance with the invention the control of a dynamic user interface of a handset, besides perhaps the ordinary handling activities, is handled by detecting activities initiated by the user in different application and registration of said activities in a list which is common for said applications and currently updated upon detection of a new activity, displaying said list upon request from the user, and allowing the user to select actions from the list for redoing or undoing-doing the selected action in dependence on the type of the action.

The invention provides a user interface for a radiophone allowing the user to use the menu items in a menu structure in a more dynamic way without losing the functionality of the phone.

A number of applications are available in e.g. new cellular phones. In addition to the call handling application, the cellular phones may handle a plurality of other applications, such as:

messages (message handling application),
diverting of incoming calls (divert application),
setting of the interface, such as volume, ringing tone, light (Ul setting application). According to the invention operations or activities performed in these applications are stored in a common list, and when an operation or activity on said list is selected for undoing or redoing, the corresponding application is accessed for undoing or redoing the operation or activity.

The list may be accessible as one of the first items in the menu structure. In contrast to the prior art, the list may contain all kinds of activities—both the call handling, the messages handling, the setting of the phone parameters, etc. The list will preferably contain between 5 and 20 items and most preferably about 10 items. When the list contains e.g. 10 items, the most frequently used functionalities will appear from the list. Hereby the list will be a dynamic picture of the type of the user. However, the future development of the displays will determine the optimum number of items present in the list.

Preferably, the list is controlled by the first in, first out principle. However, this principle may preferably be managed in an intelligent way so that the very same item does not appear twice in the list. The managing could also prevent different subsequent settings of the same parameter from appearing more than once from the list. This could apply to the setting of the ringing tunes. With regard to the phone settings this will normally require some history stored together with the list, because the former setting has to be known when the Undo instruction is executed. The Redo instruction is dedicated to the handling of calls and messages and the phone settings, while the Undo instruction is mainly dedicated to the phone settings.

A handset in accordance with the invention may allow the user to establish a connection via a telecommunications network, and comprises a transceiver for this purpose, means for inputting information into the phone, a display for displaying information to the user, a controller unit that controls the activity of the transceiver, the input means and the display. The means for inputting information are usable for performing a number of different actions including phone settings and call handling. The controller unit is provided with memory means for storing a common list which contains the latest actions performed in different applications and currently updated by the controller unit. The inputting means comprises means for requesting the display of at least a part of said updated action list on said display, and the inputting means further comprises means for entering redo or undo instructions for a selected action from said displayed action list.

A handset in accordance with the invention may be able to provide a dynamic list containing the recently most used functions of the phone. The list may contain submenu items from all menu groups, whereby doing recalls will be very easy. At the same time, e.g. muting the phone and setting the light on will be very easy—both the setting and the resetting.

It has been found to be advantageous to arrange the activities on the list sorted by time with the newest activity as the first item. Even though the navigation through the menu has become much easier in recent years, it will be easier for the user to access the first item rather than the last one.

A handset in accordance with the invention will be particularly useful in telecommunications units using a phone part for accessing a cellular communications network. These units get more and more complex due to the many applications available in addition to just handling calls. These additional applications includes SMS messages, data transmission, Internet access and so on. Therefore, the menu structure will become more and more voluminous.

BRIEF DESCRIPTION OF THE DRAWINGS

The invention will be explained more fully below in connection with preferred embodiments and with reference to the drawing, in which:

FIG. 3 schematically illustrates a part of a first embodiment of the menu structure used in a handset according to the invention; and FIG. 4 schematically illustrates a part of a third embodiment of the menu structure used in the handset according to the invention.

DETAILED DESCRIPTION OF THE INVENTION

Figure 1:
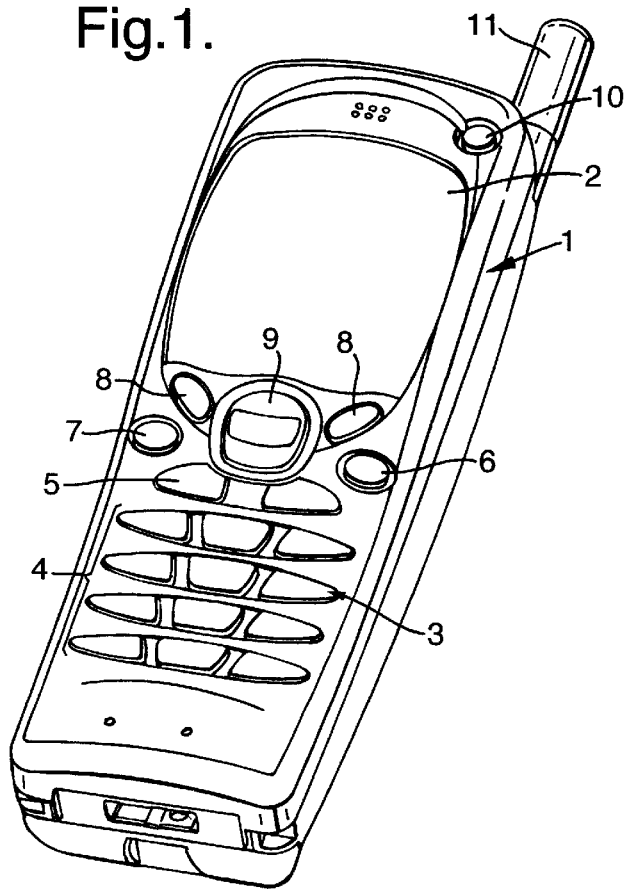
FIG. 1 shows a preferred embodiment of a handset according to the invention.
Figure 2:
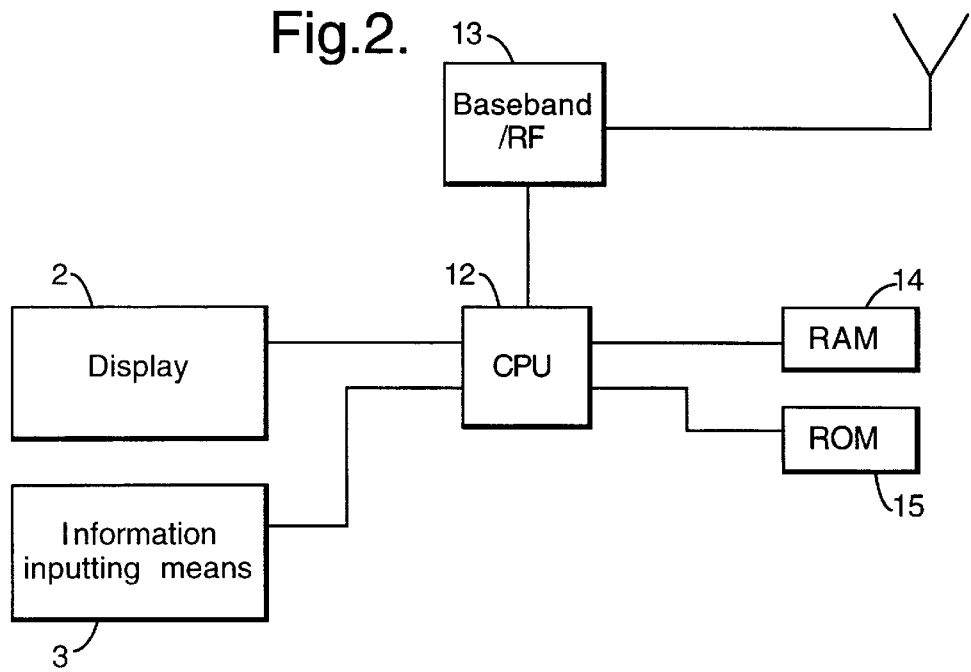
FIG. 2 shows the preferred structure of the handset according FIG. 1.

A preferred embodiment of a handset or a phone 1 according to the invention is shown in perspective view in FIG. 1. The blocks in the phone necessary to understand the invention are shown in FIG. 2. The phone 1 includes means for inputting information, said means being preferably a keypad 3 that comprises a set of alphanumeric keys 4 in the shown preferred embodiment. The alphanumeric keys have the values 0–9, * and # in numeric mode and all normally used letters and a number of special signs in alphabetic mode. Two call handling keys 5 are used for establishing and terminating calls. A key 6 is used for switching between numeric mode and alphabetic mode for the keys 4. An erase key 7 is used for deleting the last-entered digit or letter, and, when long pressed, for bringing the phone back to idle mode.

The keypad 3 furthermore comprises two soft keys 8, whose functionality changes in dependence on the mode on the phone. The functionality of the soft keys 8 is controlled by a controller or a CPU 12 and is displayed in separate areas in the display 2, said areas being adjacent to the two keys 8. The soft keys 8 are preferably used to select and execute instructions entered by the other keys or suggested by the CPU 12 and displayed in the display 2.

A scroll key 9 is included in the keypad 3 for moving a cursor through the items shown in the display 2 and for jumping in the menu structure. The scroll key 9 will advantageously be able to move a display cursor in two directions and be able to select items pointed out by the cursor by having an integrated click function. The inputting means may be supplemented with means for voice recognition.

FIG. 2 shows the parts of the phone 1 essential for the understanding of the invention. The CPU 12 is responsible for the execution of the terminal program, and the CPU 12 controls the LCD display 2 via LCD drivers (not shown). The information and the instructions inputted by the keys 3 are supplied to the CPU 12. Based on this input, the CPU 12 controls various operations including the display operation and the communication with the cellular network via a transceiver provided by a baseband/RF unit 13 and an antenna 11.

The CPU 12 is connected to a ROM 15 for storing the terminal operation program and to a RAM 14 used as a working memory area by the CPU 12. The CPU 12 uses the RAM 14 for storing a list containing the latest actions, and the contents of the list are currently updated upon the appearance of new actions.

The menu structure used according to an embodiment of the phone in accordance with the invention is shown in FIG. 3. In idle mode 16 the functionality of one of the soft key 8 will be "menu access". When menu access has been selected the phone enters a menu mode 17. As will be seen, the menu contains eight menu items: "1. Redo & Undo", "2. Phone Book", "3. Messages", "4. Call Options", "5. Phone Settings", "6. Security Options", "7. Memory Functions" and "8. Ringing Settings". The last seven items are well known from the applicant's own phones Nokia 8110™ and Nokia 3110™. The first one is novel and will be described in the following. When one of the menu items is selected in the menu mode, the phone will enter a submenu mode, e.g. the "Redo & Undo" submenu 18.

However, the Redo/Undo functionality does not necessarily have to be available via the menu of the phone. The functionality might be useful when it is available via a dedicated key or via a soft key with context sensitive functionality.

Simple Redo & Undo Concept

When the user undoes an operation, the phone may preferably show him what will happen when doing so. This will especially be helpful when the undo concept is based on a simple resetting of a parameter to the value it had before the last setting. When all actions are included in the list, this concept may fully replace the lists of the latest ingoing and outgoing call.

In idle mode the phone may have an idle display 16. In a separate part 19 of the display it is shown that the two soft keys 8 have the functionalities "menu" and "phone book", respectively. The name of the network operator "SONOFON" is also displayed. Status bar and indication icons are omitted from the display for clarity.

When activating one of the two soft keys 8, the menu loop or the phone book will be entered, respectively. Alternatively, when using the scroll key 9, the first subitem in the first submenu (Redo & Undo) will be displayed when scrolling up and the last subitem when scrolling down. By activating the "menu" soft key 8, the phone will enter the menu mode, and it will appear on the display 2.

It will be seen that the display now contains a part of the list including available menu items under the menu mode 17. The list may be handled as an endless loop and the items on the list may be numbered. Eight items are shown in order to have a better overview of the list, but in practice three to five items will be displayed. A cursor 20 may mark one of the items on the list, and the scroll key 9 may move the cursor 20 in upward or downward directions. An item may be selected from the displayed part of the list by clicking on the scroll key 9 or by pressing the left soft key 8. The menu mode may be left by pressing the right soft key 8.

When clicking the left soft key 8 with the cursor 20 pointing out the "Redo & Undo" item, the phone will enter the Redo & Undo submenu display 18, and a number of the items on that list will be displayed as shown in the display 18. Hereby the display of at least a part of said updated "Redo & Undo" list may be requested. The list is handled as an endless loop and the items on the list may be numbered. In practice, only some of the items on the list will be displayed at the same time.

When the user selects one of the items on the "Redo & Undo" list, this is done by clicking the scroll key 9 or by pressing the appropriate soft key 8. In response, the CPU 12 will execute the action, the reverse action or a similar user specified action. Even though both the "Do again" and the "Undo" functionalities are displayed in FIG. 3, only functionalities valid for the item pointed out by the cursor will be displayed in practice.

As mentioned above, the user has two options for using the list. He can redo (do again) an operation, and this will often be convenient when the user has done a communication activity. These kinds of activities could comprise reading of SMS messages, writing and transmission of the same, making a call, making a redial, etc.

Similarly, the user may undo an operation. This operation will be valuable when he has changed a certain setting to something else, e.g. to silent mode during a meeting. Then the phone simply returns to normal ringing upon use of the undo soft key. This will set the "value" of the setting back to the value it has before the operations were made. This resetting will be done without the user having to consider whether the value has been changed in the meantime. For this purpose, the setting of the parameter has to be stored in the phone, but there is no need to display the old parameter to the user in the "Redo & Undo" list.

Some operations cannot be undone, e.g. a short message transmission. In this case the "Undo" soft key text will be removed. The user can then only redo this operation.

Reference is now made to the "Redo & Undo list" 18. All items in the main menu are shown in the figure, but generally only three to five items will be displayed at the same time. The item 1.1 informs the user that incoming calls are being diverted to "+45123456". Redoing this action does not affect the present divert status when this status is already valid for the phone. When the action is undone the new divert status will be shown to the user before execution. If the item 1.1 was a result of e.g. a redo operation, the undoing of this does not necessarily lead to the new divert status "divert all incoming calls to Brian", as defined as item 1.8.

However, the action in item 1.8 may both be redone and undone. When the action 1.8 is redone, all calls will be diverted to Brian. His name appears from the phone book ,and the phone links the divert number together with the name. When the action 1.8 is undone, the user cannot see the effect of this action in advance.

Also item 1.9 may be redone and undone. When the action is redone, all diverts will be cancelled. The result of undoing this action cannot be seen from the list, but will be displayed to the user if he initiates the undo action.

In FIG. 3 the user has selected item 1.1 for undoing, and the phone asks the user in display 25 to confirm that incoming calls shall be diverted from now on to "+45456782342345". If the user selects "cancel", the phone jumps back to the "Redo & Undo" list 18 without changing the divert status. If the user selects "do it", the phone jumps back to the idle mode display 16 and the divert status is changed accordingly. If the user presses the "clear" key, the phone jumps back to the idle mode display 16 without changing the divert status.

Some operations are difficult to redo, or it does not make sense to redo them, e.g. sending the same short message. Doing such operations could simply make the phone enter the "Messages/Write Message" option, allowing the user to define a new message.

Item 1.2 allows the user to read an SMS message. This item cannot be undone. If the user selects this item, the phone will jump to the "SMS read submenu" under "3 Messages" in the main menu 17. All items in the main menu are shown in the figure, but generally only three to five items will be displayed at the same time. A list of SMS messages in the memory will be presented to the user.

Similarly, if the user selects to transmit an SMS message via item 1.5 in the "Redo & Undo" list 18, a display 21 will appear asking the user to type the message text. When the user has typed the text, he may select "option" to "save", "send" or "erase" the typed text in display 22. If he places the cursor 20 pointing at "send" and selects this item, he is requested to enter the number of the receiver in display 23 and the message center number of the operator in display 24. When this is done, the phone returns to the idle mode 16. During the transmission operation the user may select "quit" and go back to the "Redo & Undo" list 18.

The items 1.3 and 1.7 in the "Redo & Undo" list 18 allow the user to switch the light on and off. Both items may be redone and undone. However, no changes will be made by redoing the "light off" and undoing the "light on". Therefore, two opposite operations may advantageously result in the oldest one being removed from the list.

Items 1.4 and 1.6 relate to alerting, and both items may be redone and undone without any problems. Item 1.10 relates to the alert volume and causes no problems. The display 26 asks the user to acknowledge the undoing. Ringing tune and silent mode could have been on the list, too.

Item 1.11 represents the latest outgoing call, and a new call may be established by redoing this activity. Undoing is not possible. Item 1.12 represents an ingoing missed call. The phone recognized "Jane" as the caller by reference to the phone book. If a dial has been done recently without success, the redial number would appear from the list.

When an action has been executed, e.g. switching the light on, the CPU 12 looks in the list to find exactly the same action. This action can be found as item 1.7. Then the CPU 12 moves the item 1.7 to the position 1.1. The items 1.1 to 1.6 are moved to positions 1.2 to 1.7.

If the executed action was "calling Peter", the CPU 12 could not find an older version on the list. Then the CPU 12 would have to place the new action in position 1.1, move the items 1.1 to 1.11 to the positions 1.2 to 1.12, and to delete item 1.12. This applies to both actions executed via the "Redo & Undo" list and actions executed in the traditional way.

Advanced Redo & Undo Concept

Some operations are difficult to handle, especially undoing, like undoing a divert. Divert may depend on conditions, e.g. divert when busy or divert in case of data calls. Should the divert be cancelled, or should the phone be diverted to the phone number that it was diverted to before the specific divert operation was made? As an alternative to simply undoing the operation to the value it had before this particular operation, the problem can be handled in a second embodiment either by removing older similar actions of the same type, e.g. diverts, from the "Redo and Undo" list, or by introducing special lists for some of the items. With reference to the "Redo and Undo" list 18 in FIG. 3, the item 1.6 "Ringing tones", the item 1.7 "Light on", the item 1.8 "Divert to Brian" and the item 1.9 "Clear all diverts" would have been deleted when the items 1.1 "Divert to +45123456", 1.3 "Light off" and 1.4 "Ringing tone:Beep" entered the list.

Advanced Redo & Undo Concept based on Access to Sublists

According to a third embodiment the selection of some of the items on the "Redo & Undo" list provides access to sublists including items having the same functionality, e.g. diverting. The number of items present in the main "Redo & Undo" list could be reduced to e.g. 8. When e.g. a divert action has been done recently, divert will be qualified for the "Redo and Undo" list, and the selection of this item could access a divert list e.g. including the last ten different divert actions. The sublists, e.g. the divert list, must be stored in the phone even if divert is not qualified for the main "Redo & Undo" list for a period.

Due to the limited number of items on the list, outgoing calls could preferably be redone by accessing an outgoing call list via the "Redo & Undo" list. Correspondingly, the redial list could be accessible via the "Redo & Undo" list. Alternatively, only e.g. three outgoing numbers could be allowed in the Redo & Undo list. The oldest one is removed upon the appearance of a new number.

By doing so, the "redial" list of the phone could be merged into the "Redo & Undo" list. Similarly, the "calls made" list could be available as an item in the "Redo & Undo" list.

In principle, it could be decided that this "Redo & Undo" list should store everything that the user does with the phone. In principle, this will not cause any problems, since this would just "merge" existing lists into the "Redo and Undo", and some new lists have to be created.

The third embodiment is shown in FIG. 4, and the idle mode display 16, the main menu display 17 and the "Redo & Undo" list 18 are basically the same as described with reference to FIG. 3. However, it can be seen that no similar items appear on the display 18—even if more items should be qualified to appear on the list. If the user selects item 1.1 "Diverts", a divert list 27 will be shown on the display. This list contains the same three diverts as shown in FIG. 3. Only redoing is possible according to this embodiment whereby the user knows the effect of the action. There is no need for acknowledgement from the user. The items on the list are the recently executed actions on top and access to the divert submenu in the menu structure of the phone (4. Call option). This allows the user to create a new divert if he cannot use the items on the list. The number of items could be e.g. eight.

The phone will typically include a substantial number of ringing tones, and selecting item 1.2 "Ringing tunes" could allow the user to access the ringing tone list 28 in the "8. Ringing setting" menu of the main menu 17. The list may be entered at the selected ringing tone (ringing tone 24).

The outgoing calls are listed according to the prior art, and according to the invention the list is available via the "1.3 Outgoing calls" item. The redialing list and the missed call list are available in the same way via the redial item 1.7 and the missed calls item 1.10, respectively. The missed calls list 30 is shown, and it will be seen that Jane appears twice on the list. This could indicate that she wants to talk with the holder of the phone. When she is called back, both appearances could be removed from the list simultaneously.

The sound volume and the ringing volume may be adjusted, the items "1.4 Sound volume" and "1.6 Ringing volume" giving access to lists containing the sound volume levels and the ringing volume levels, respectively.

The item "1.5 Silent mode" is still a pure redo/undo parameter. The same applies to the "1.9 Light on" item.

The item "1.8 Messages" would bring the user to the "3 Messages" menu 29 in the main menu 17. When the user selects "3.3 Write SMS", he will go to the display 21 in FIG. 3.

As a short cut option for the third embodiment, the "Redo & Undo" list, in this case, could be placed on the off-hook key, replacing the redial function.

To minimize the size of each item in the list, small icons (e.g. for divert: , etc.) could be used. This allows additional descriptive information to be added to each item, like divert number/name.

Hereby the user will have the options of undoing any of these changes, and doing the operations again. The menu is preferably simply a list of all operations made (preferably sorted in an intelligent manner), and the user can then do one of these operations again, or he can undo one of them.

When the "Redo & Undo" list contains redial numbers, too, the "Redo & Undo" list could be placed on the off-hook key (the call establishment normally has the "redial" functionality in idle mode), replacing the "redial" functionality.

Above the activities on the Redo & Undo list are sorted in dependence on their age, but it could be found useful to allocate a fixed number of locations, e.g. 3, at the top of the list to e.g. the last-dialed calls.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A method of handling the control of a dynamic user interface of a telephone that allows the user to establish a communication via a telecommunications network, said telephone allowing the user to access a number of applications in addition to call handling, said method comprising:

registering information input into the telephone;

displaying information in a display;

monitoring the activities of the telephone;

detecting activities initiated by the user in said number of applications as well as activities occurring in relation to call handling, and registering said activities in a common list which is currently updated upon detection of a new activity, said activities including silent, redo, and undo;

displaying said common list upon request from the user; and allowing the user to select actions from said displayed common list and redoing or undoing the selected action in dependence on the type of the action.

2. A method according to claim 1, wherein the current updating of the common list includes entering the most recently done activity on the list to replace an earlier done activity.

3. A method according to claim 1, wherein when a new activity is detected, and before entering the new activity to said common list, said method comprises, analyzing whether a similar activity is already present on the common list, and if a similar activity has been done earlier, the new activity is entered on the list to replace said earlier done similar type activity, otherwise the new activity is entered on the common list to replace the oldest activity on the common list.

4. A telephone allowing the user to establish a connection via a telecommunications network, and including a number of applications in addition to call handling, said telephone comprising:

a transceiver for communication with the network;

means for inputting information into the telephone;

a display for displaying information;

a controller unit controlling the activity of the transceiver, the input means and the display;

said means for inputting information being usable for performing a number of different actions in said applications;

said controller unit detecting activities initiated by the user in relation to call handling as well as in said number of applications, said activities including silent, redo, and undo; said controller unit having an associated provided memory for storing a common list which contains the latest actions performed in said applications, and said memory being currently updated by the controller unit;

said inputting means comprising means for requesting the display of at least a part of said updated common action list on said display; and said inputting means further comprising means for entering redo or undo instructions for a selected action from said displayed common action list.

5. A telephone according to claim 4, wherein the information inputting means comprises a keypad including a set of alphanumeric keys and at least one scanning key for scanning through a menu structure and at least one selection key for selecting an item in the structure.

6. A telephone according to claim 4, wherein said updated action list is available as an item in the menu structure and is selectable by activating said at least one selection key.

7. A telephone according to claim 4, wherein the controller unit defines the functionality of said at least one selection key to be "redo" or "undo" in dependence on the kind of the item pointed out by the scanning key.

8. A telephone according to claim 4, wherein the controller unit, when currently updating the common list, enters the activity most recently done to replace an earlier done activity.

9. A telephone according to claim 8, wherein the controller unit analyzes the activity most recently done before entry to the common list, and if a similar activity has been done earlier, the activity most recently done will be entered on the common list to replace said earlier done similar type activity, otherwise the activity most recently done will be entered on the list to replace the oldest activity on the common list.

10. A telephone according to claim 4, wherein the controller unit arranges the activities on the common list sorted by time with the newest activity as the first item.

11. A telephone according to claim 4 and used in a cellular communications network.

* * * * *